April 21, 1959     J. C. WISNIESKI     2,882,653
BUFFING WHEEL STRUCTURE
Filed Dec. 31, 1953     2 Sheets-Sheet 1
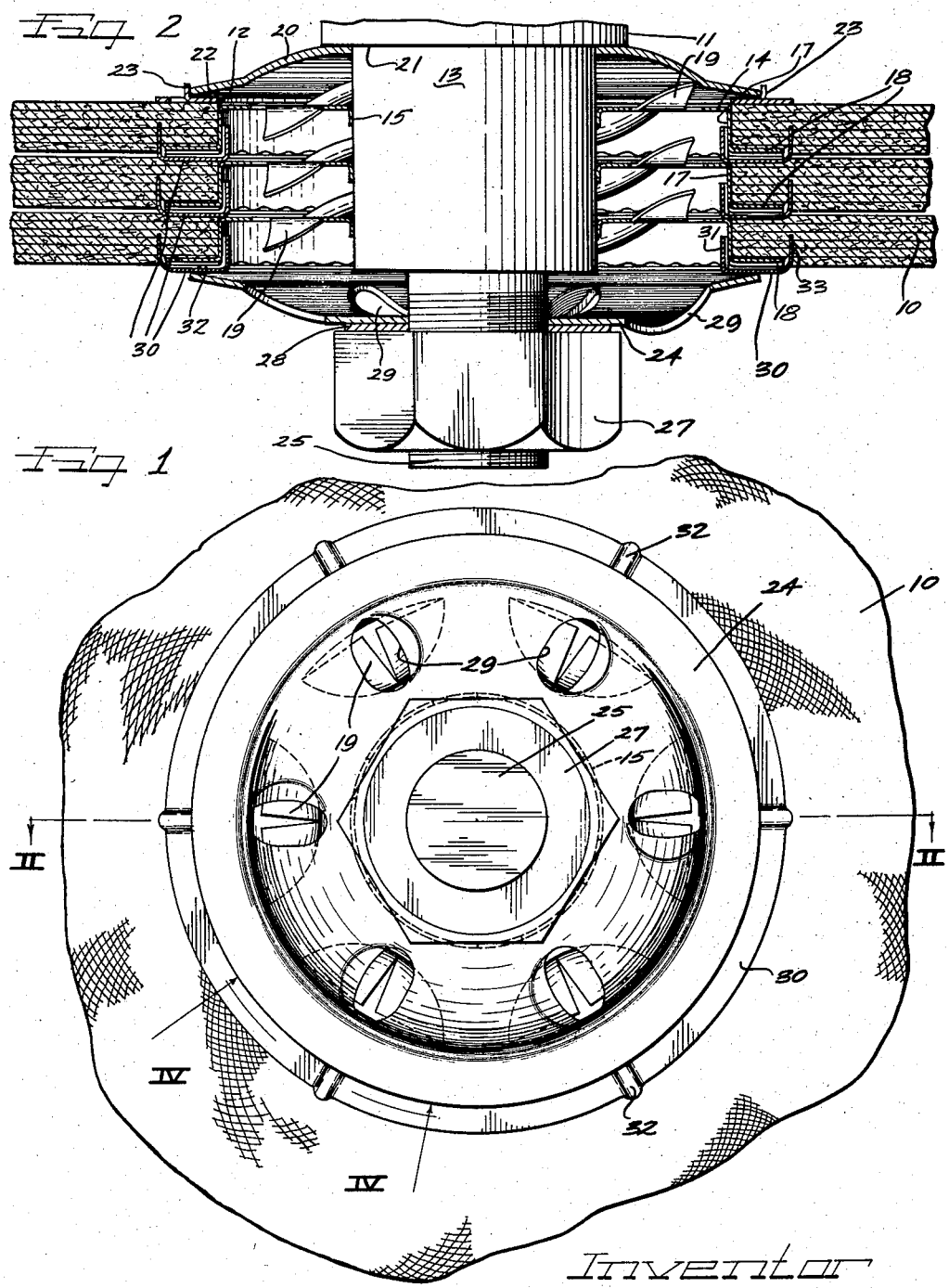
Inventor
John C. Wisnieski

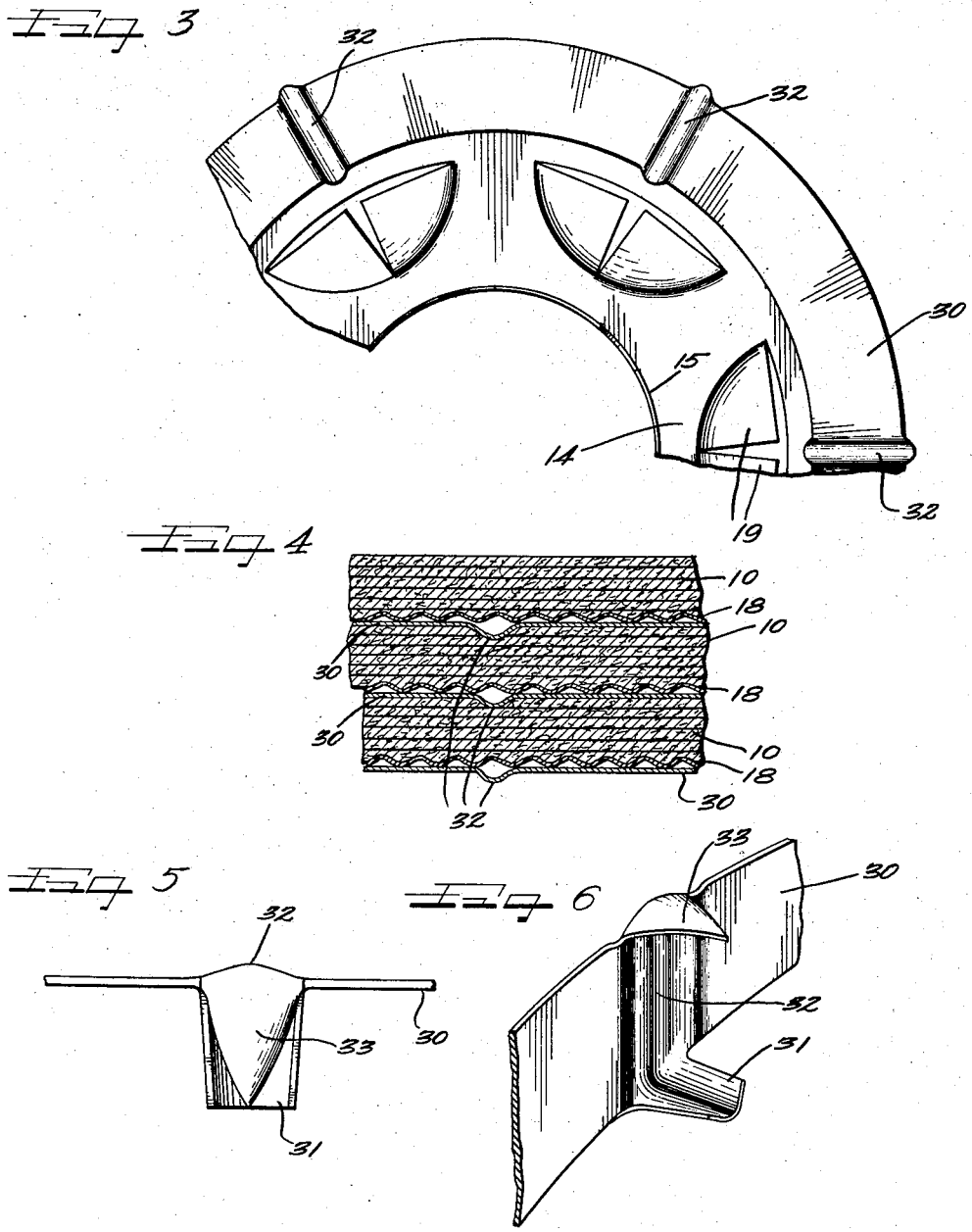

United States Patent Office 2,882,653
Patented Apr. 21, 1959

2,882,653

BUFFING WHEEL STRUCTURE

John C. Wisnieski, Detroit, Mich., assignor to Lyon, Incorporated, Detroit, Mich., a corporation of Delaware Application December 31, 1953, Serial No. 401,560

3 Claims. (Cl. 51—193)

The present invention relates to improvements in buffing wheel structures and more particularly concerns buffing wheels of the type comprising an assembly of cooperating buffing disks.

An important object of the present invention is to provide improved means for attaining maximum ventilation through a buffing wheel comprising an assembly of concentrically mounted cooperating buffing disks.

Another object of the invention is to provide an improved reusable buffing disk supporting structure.

A further object of the invention is to provide improved means for use in a buffing disk assembly to maintain air circulation passages from within a hollow supporting hub structure into the interface areas between adjacent disks.

Still another object of the invention is to provide improved means for retaining buffing wheel disks liable to radial distortion in service against such distortion by holding the same to substantial concentricity about a supporting hub structure.

A still further object of the invention is to provide a novel auxiliary ring structure for use with a buffing disk assembly.

Other objects, features and advantages of the present invention will be readily apparent from the following detailed description of a preferred embodiment thereof taken in conjunction with the accompanying drawings, in which:

Figure 1 is a side elevational view of a buffing wheel structure embodying the features of the present invention;

Figure 2 is a diametrical sectional view through the buffing wheel taken substantially on the line II—II of Figure 1;

Figure 3 is an enlarged fragmentary side elevational view of one of the buff disk supporting rings and an auxiliary spacer and retaining ring assembled therewith;

Figure 4 is a fragmentary sectional detail view taken substantially on the line IV—IV of Figure 1;

Figure 5 is an enlarged fragmentary outer edge view of one of the auxiliary spacer rings, and Figure 6 is a fragmentary perspective view of one of the auxiliary spacer and retaining rings.

As exemplary of the present invention, there is shown in Figures 1 and 2 a buffing wheel comprising a plurality of buff disks 10 mounted in cooperative concentric side by side relation for rotary operation upon a spindle 11. Each of the disks 10 may be made from a fabric or fabric-type material such, for example, as fairly loosely woven sisal cut on a bias and formed into rings and sewed, with a central cylnidrical opening providing an inner periphery 12.

The inner diameter defined by the inner periphery 12 of the buff rings 10 is substantially larger than the diameter of a reduced diameter end portion 13 of the spindle 11 about which the buff disks are to be mounted and respective hub rings 14 stamped from suitable gauge sheet metal are mounted on the spindle portion 13 in supporting relation to the buff ring disks. Each of the hub rings 14 has an inner angular annular reenforcing and spindle engaging flange 15. Adjacent to its outer margin, each of the hub rings is provided with an angular offsetting and seating flange 17 of annular shape and of an external diameter to receive one of the buff rings with the inner periphery 12 slidably fitting thereon. A uniformly corrugated outer margin 18 of the hub ring lies alongside the inner margin of the buff disk assembled thereon. This corrugated margin is intended not only to retain the buff disk against turning on the hub disk but also to provide radial ventilation channels through which air can be circulated from the space radially inwardly from the seating flange 17 outwardly through the air channels and into and through the buff ring assembly for cooling purposes. Each of the hub rings 14 is provided with a series of openings defined by air circulation promoting vanes 19. Thereby, as the buff assembly is rotated with the spindle 11, air is caused to move radially outwardly through the buff assembly.

In mounting the buff disk and hub ring assembly on the spindle 11, a dished centrally apertured backing plate 20 is placed upon the reduced diameter spindle portion 13 and backed against a shoulder 21 at juncture of the reduced diameter with the normal diameter portion of the spindle. A pressure disk ring 22 is then mounted against the margin of the backing plate 20, with struck out centering tongues 23 engaging the edge of the backing plate. The inner diameter of the pressure disk 22 is preferably approximately the same as the diameter of the annular buff disk supporting shoulders 17 of the hub rings. The hub ring and buffing disk units are then assembled in the number desired in side by side relation upon the spindle portion 13, with the corrugated marginal portions 18 of the hub rings on the front sides of the buff disk margins, that is the sides of such margins away from the backing plate 20. Thereby the free side of the inner margin of the innermost of the buffing disks 10 lies against the pressure plate 22. An outer dished compression plate 24 has a central aperture received about a further reduced terminal portion 25 of the spindle and has its margin directed toward the outermost hub ring corrugated margin 18. A retaining nut 27 is threaded onto the spindle terminal 25 and is drawn up against a washer 28 bearing against the hub portion of the plate 24. A series of air inlet openings 29 provided with air scoop vanes is formed in the compression plate 24 for entry of air into the chamber defined within the assembly for cooling circulation through the buff assembly.

It will be observed that due to the clamping compression under which the buff disk assembly must necessarily be maintained between the back plate 20 and the front clamping plate 24 in service, fairly complete filling-in of the radial grooves in the corrugated marginal flanges 18 by the relatively soft material of the buff disks will occur. This will be so even though the inner margins of the disks are treated with a rather hard binder such as a phenolic or other similar material. This filling-in effect is visualized in Figure 4 on the upper sides of the corrugated flanges 18 as depicted in this view. In the absence of any supporting or liner means between the margins of the contiguous disks 10 on the opposite sides of the corrugated flanges 18, the channels in the marginal flanges 18 through which cooling air should circulate in service will also be at least substantially filled and thus block efficient air circulation.

According to the present invention liner means are provided between the outer surfaces of the corrugated marginal flanges 18 of the hub rings and the contiguous margins of the buff ring disks 10 carried by the immediately adjacent hub disks so as to maintain the air circulation radial channels in the corrugated marginal flanges 18 clear of obstruction and thereby affording free air circulation into the buff disk assembly. To this end respective auxiliary spacer rings 30 are provided which are preferably flat in major plane and of inside and outside diameter approximately the same or only slightly different than the inside and outside diameters of the hub flange marginal flanges 18 so as to be adapted for effective face to face relation to the outer sides of the marginal flanges in overlying, protective relation to the air circulation channels or grooves in the flanges 18. The thickness or gauge of the auxiliary annuli or rings 30 should be selected for minimum thickness compatible with the service requirements which the rings must meet, such as compression forces that must be withstood, the size of the buff unit in which the rings are to be used, the nature of the buff material, and the like. In a typical practical example, the thickness of the auxiliary rings 30 has varied from .020 to .032 inch. In this particular practical embodiment, it was found that where the thickness of the rings was below .020 inch there was a tendency of the rings to deform under compression into the channel-forming corrugations of the hub plate marginal flanges 18. On the other hand, where the thickness was over .032 inch, excessive spacing was maintained between the buff disks so that streaking of the work developed due to excessive spacing effected by the spacer rings.

For centering the spacer rings 30 in assembly, they are provided with respective series of inner peripheral angular fingers 31 formed integrally in one piece therewith and transversely arched for longitudinal rib-like rigidity. In forming the centering tabs or fingers 31, they are initially stamped in the flat with the body portions of the ring 30 and respective transverse grooves 32 are formed in the ring 30 to extend longitudinally through the tabs 31. Then the fingers or tabs 31 are bent preferably into right angular relation to the ring 30 toward the inside of the associated groove 32. As an incident to such angular bending of the fingers the sides of the arched fingers are drawn progressively closer together toward the tips of the fingers, thereby increasing the arched rigidity thereof toward their tips. While the centering fingers 31 are substantially rigid, there is yet sufficient resiliency therein so that should the diameter prescribed by the edges of the series of fingers be slightly greater or at some point non-uniform relative to the inside diameter of the supporting shoulder 17 of the buff hub ring with which the spacer ring is to be assembled, the centering finger or fingers that have the edges thereof disposed toward outside eccentricity will yield sufficiently to conform to the hub ring flange diameter.

It will be observed that the grooves 32 provide on the opposite face of the ring 30 corresponding transverse ribs. In the assembly such ribs are of value in providing anti-turn anchorage for the buff rings pressed thereagainst by embedding in the buff ring margin, as best seen in Figure 4. Moreover, the outermost of the spacer rings 30 presents the uniform series of transverse ribs 32 as reenforced engagement areas for the outer compression plate 24, as best visualized in Figure 2.

In addition to their function as spacers, the rings 30 are provided with means for maintaining the inner diameters of the buff ring disks 10 against elongation or any substantial radially outward distortion due to operating pressures or other distorting factors in service. To this end, the spacer rings 30 are provided with respective series of retaining prongs 33 which are preferably tapered to sharp points and arranged to extend beyond the outer edges of the respectively associated hub ring margins 18 into penetrating relation to the margins of the respective buff rings carried by the associated hub rings. Expediently the prongs 33 are formed substantially counterpart to the retaining fingers 31 but from the outside diameter edge of the respective spacer ring 30. By formation of the prongs 33 with transversely arched, rib-like shape they are substantially rigidified and will thus resist deformation as an incident to driving the same into penetrating relation within the associated buff ring margin. As a result of the uniform, symmetrical spacing of the prongs 33 about the periphery of the spacer ring 30, uniform retention of the associated buff ring against inner marginal elongation is attained. In a typical example, as best seen in Figures 1 and 3, a six prong arrangement has been found quite serviceable. By having the centering fingers 31 and the corresponding retaining prongs 33 widely spaced and of minimum width, no appreciable blocking of air circulation through the buff assembly is experienced.

Among other advantages enumerated herein, the spacer rings 30 have the attribute of reusability, in common with the hub rings 14, thus affording a highly economical construction. As a result, when the buff rings 10 have worn down or become damaged, or for some other reason must be replaced, the buff assembly can be readily rebuilt by disassembling the hub rings and the buff rings that must be replaced from the spindle 11 and then unlocking the buff rings from the hub rings by removing the spacer rings 30. New buff rings 10 can then be assembled with the hub rings and the spacer rings 30 and the rings reassembled on the spindle.

It will be understood that modifications and variations may be effected without departing from the scope of the novel concepts of the present invention.

I claim as my invention:

1. In a buffing wheel structure, an annular spacer plate ring having along its inner margin spacer fingers for concentricity engagement with a buff hub ring and along the outer margin penetrating prongs for engagement within a buff ring assembled on an associated hub ring.

2. In a buffing wheel assembly including a buffing ring and a hub ring having an annular cylindrical flange forming a seat for the inner margin of the buffing ring with a generally radially extending flange on the hub ring alongside the inner margin of the buff ring, said radially extending flange having air circulation grooves on the face thereof directed away from the buff ring margin, a spacer plate axially separably coactive with said radially extending flange for maintaining the air circulation grooves open, said spacer plate having transversely projecting reenforcing ribs extending to the side thereof facing away from the radially extending flange and providing radial air passages, said ribs having as continuations thereof angular centering fingers of rib-like reenforced structure engageable with the radially inwardly facing surface of said cylindrical flange and retaining prongs of rib-like reenforced structure extending angularly from the plate in the same direction as said fingers for projection over and beyond said radially extending flange for retaining penetrating engagement within the inner marginal portion of the buffing ring, the construction and relationship being such that to effect separation of the assembly the buffing ring must be moved in one axial direction and the spacer plate must be moved in the opposite axial direction relative to said radially extending flange.

3. In a buffing ring construction, a spacer and protective annular plate member adapted to lie separably along one side of a corrupated marginal flange of a hub ring while a first buffing member is engageable with the opposite side of said marginal flange, said annular plate member having transversely projecting stiffening ribs thereacross with angular transversely arched reenforced fingers projecting from said ribs laterally relative to the plate member for cooperating with the hub ring to maintain the plate member and hub ring concentric, and penetrating fingers projecting transversely from the plate member to extend across said corrugated marginal flange of the hub ring to penetrate the buff member and retain the same in concentric assembly with the hub ring.

References Cited in the file of this patent

UNITED STATES PATENTS

| | | |
|---|---|---|
| 2,124,114 | L'Hommedieu | July 19, 1938 |
| 2,140,208 | Murray | Dec. 13, 1938 |
| 2,198,282 | Hall | Apr. 23, 1940 |
| 2,519,275 | Mollica | Aug. 15, 1950 |
| 2,531,249 | Blair et al. | Nov. 21, 1950 |
| 2,539,844 | Kingsbury | Jan. 30, 1951 |
| 2,573,874 | Richards | Nov. 6, 1951 |
| 2,633,680 | Goldberg | Apr. 7, 1953 |